(12) United States Patent
Potter et al.

(10) Patent No.: US 9,128,697 B1
(45) Date of Patent: Sep. 8, 2015

(54) COMPUTER NUMERICAL STORAGE FORMAT WITH PRECISION TYPE INDICATOR

(75) Inventors: Terence M. Potter, Austin, TX (US); James Wang, Vista, CA (US)

(73) Assignee: Apple Inc., Cupertino, CA (US)

( * ) Notice: Subject to any disclaimer, the term of this patent is extended or adjusted under 35 U.S.C. 154(b) by 709 days.

(21) Appl. No.: 13/403,618

(22) Filed: Feb. 23, 2012

Related U.S. Application Data

(60) Provisional application No. 61/508,977, filed on Jul. 18, 2011.

(51) Int. Cl.
  *G06F 15/00*   (2006.01)
  *G06F 7/38*    (2006.01)
  *G06F 9/00*    (2006.01)
  *G06F 9/44*    (2006.01)
  *G06F 9/30*    (2006.01)

(52) U.S. Cl.
  CPC ........ *G06F 9/30014* (2013.01); *G06F 9/30025* (2013.01)

(58) Field of Classification Search
  None
  See application file for complete search history.

(56) References Cited

U.S. PATENT DOCUMENTS

| | | | |
|---|---|---|---|
| 5,940,311 A | 8/1999 | Dao | |
| 6,971,038 B2 * | 11/2005 | Santhanam et al. | 713/324 |
| 7,236,995 B2 | 6/2007 | Hinds | |
| 7,565,513 B2 * | 7/2009 | Ahmed et al. | 712/222 |
| 7,725,519 B2 * | 5/2010 | Dockser | 708/497 |
| 7,849,294 B2 | 12/2010 | Gschwind | |
| 7,889,204 B2 | 2/2011 | Hansen | |
| 8,595,279 B2 * | 11/2013 | Dockser | 708/513 |
| 2005/0066205 A1 * | 3/2005 | Holmer | 713/320 |
| 2007/0203967 A1 * | 8/2007 | Dockser | 708/495 |
| 2009/0198977 A1 * | 8/2009 | Gschwind et al. | 712/226 |
| 2010/0060629 A1 * | 3/2010 | Rasmusson et al. | 345/419 |
| 2010/0095086 A1 * | 4/2010 | Eichenberger et al. | 712/2 |
| 2012/0151191 A1 | 6/2012 | Boswell et al. | |

OTHER PUBLICATIONS

Office Action in U.S. Appl. No. 13/403,674 mailed Mar. 19, 2015, 14 pages.

* cited by examiner

*Primary Examiner* — George Giroux
(74) *Attorney, Agent, or Firm* — Meyertons, Hood, Kivlin, Kowert & Goetzel, P.C.

(57) ABSTRACT

Various techniques for storing computer numbers such as floating-point numbers. In one embodiment, a data processing unit is configured to represent floating-point numbers using a first precision with a first number of bits and a second precision with a second number of bits, where the second number of bits is greater than the first number of bits. A floating-point type value may be set upon a memory store to indicate whether a first representation of a floating-point number uses the first or the second number of bits. A second representation of the floating-point number and the floating-point type value may be stored accordingly. In some embodiments, the second representation may correspond to the first representation with one or more bits shifted. This format may lead to memory power savings when reading from a memory location of the second precision when the result is indicated as the first precision.

20 Claims, 9 Drawing Sheets

16 bit floating-point format 310

32 bit floating-point format 320

Floating-Point Storage format 330

FIG. 3

16 bit floating-point format 310

| S | E | E | E | E | M | M | M | M | M | M | M |

32 bit floating-point format 320

| S | E | E | E | E | e | e | e | M | M | M | M | M | M | M | M | M | M | M | M | M | M | M | M | m | m | m | m | m | m | m | m |

Floating-Point Storage format 330

| S | E | E | E | E | M | M | M | M | M | M | M | M | M | M | M | M | M | e | e | e | m | m | m | m | m | m | m | m | m | m | m |

| t | t |

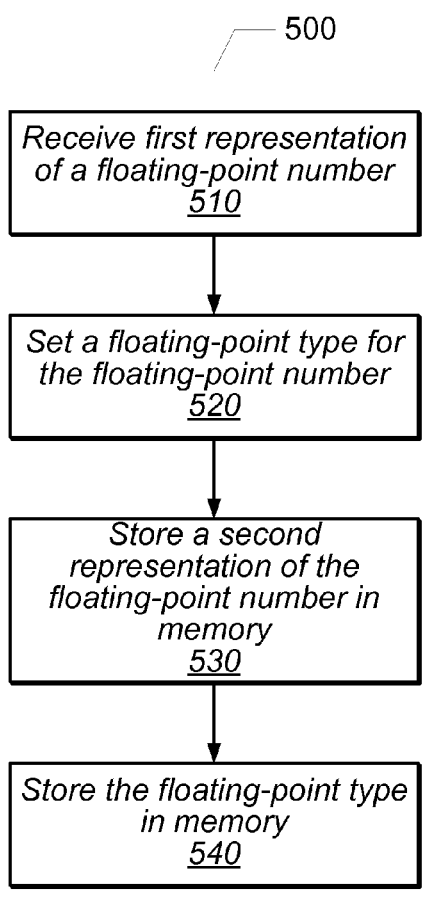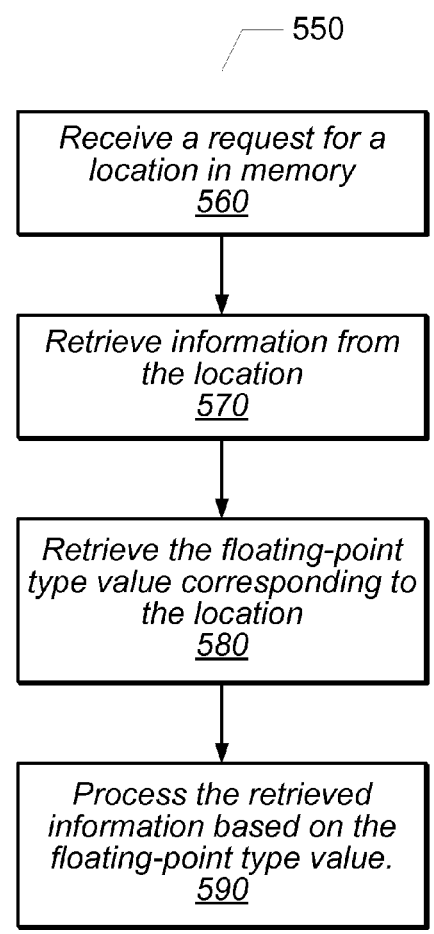
FIG. 5A
FIG. 5B

FIG. 8A

*Legend:*

32-bit floating-point format 320:
| S | E | e | e | e | E | E | E | E | M | M | M | M | M | M | M | M | m | m | m | m | m | m | m | m | m | m | m | m | m | m | m |

16-bit floating-point format 310:
| S | E | E | E | E | E | M | M | M | M | M | M | M | M | M | M |

Floating-Point Storage format 330:
| S | E | E | E | E | E | M | M | M | M | M | M | M | M | M | M | e | e | e | m | m | m | m | m | m | m | m | m | m | m | m | m |

| t | t |

*Example 1: number = 2*

32-bit floating-point representation 810:
| 0 | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

16-bit floating-point representation 820:
| 0 | 1 | 0 | 0 | 0 | 1 | 0 | 0 | 0 | 0 | 0 | 0 | 0 | 0 | 0 | 0 |

Type = 32 bit number readable as a 16 bit number.

Value Stored 830:
| 0 | 1 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| 0 | 0 |

*Example 2: number = 2^16*

32-bit floating-point representation 840:
| 0 | 1 | 0 | 0 | 0 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

16-bit floating-point representation 850:
Can't be represented (set to infinity)

Type = large number.

Value Stored 860:
| 0 | 1 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |

| 1 | 0 |

FIG. 8B

Legend:

32-bit floating-point format 320:
| S | e | e | e | E | E | E | E | M | M | M | M | M | M | M | m | m | m | m | m | m | m | m | m | m | m | m | m | m | m | m | m |

16-bit floating-point format 310:
| S | E | E | E | E | E | M | M | M | M | M | M | M | M | M | M |

Floating-Point Storage format 330:
| S | E | E | E | E | E | M | M | M | M | M | M | M | M | e | e | e | m | m | m | m | m | m | m | m | m | m | m | m | m | t | t |

*Example 3: number = 2^-18*

32-bit floating-point representation 910:
| 0 | 0 | 1 | 1 | 0 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

16-bit floating-point representation 920:
Can't be represented (flushed to 0).

Value Stored 930:                                                        Type = small number
| 0 | 0 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |

*Example 4: number = 2 (originally stored as 16-bit value)*

32-bit floating-point representation 940:
| 0 | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

16-bit floating-point representation 950:
| 0 | 1 | 0 | 0 | 0 | 0 | 1 | 0 | 0 | 0 | 0 | 0 | 0 | 0 | 0 | 0 |

Value Stored 960:                                                        Type = 16 bit number.
| 0 | 1 | 0 | 0 | 0 | 0 | 1 | 0 | 0 | 0 | 0 | 0 | 0 | 0 | 0 | 0 | x | x | x | x | x | x | x | x | x | x | x | x | x | x | 1 | 1 |

COMPUTER NUMERICAL STORAGE FORMAT WITH PRECISION TYPE INDICATOR

This application claims the benefit of U.S. Provisional Application No. 61/508,977 filed on Jul. 18, 2011, which is incorporated by reference herein in its entirety.

BACKGROUND

1. Technical Field

This disclosure relates generally to computer processors, and more particularly to storage and manipulation of numbers within processors.

2. Description of the Related Art

Computing elements use many formats to represent numbers (e.g., in memory). One type of number formats used by computing element is "floating-point"; another is "fixed-point." Floating-point formats are commonly used, for example, in scientific applications involving a large range of numbers (i.e. involving very small and/or very large numbers), while fixed-point may be used for applications where the range of numbers is relatively small.

There are various floating-point standards, which may represent the following attributes of a number: sign, significand (also referred to as the "mantissa"), and exponent. A floating-point number can be represented as follows: mantissa×base$^{exponent}$ (a sign bit may also be included, indicating whether the number is positive or negative). Accordingly, for binary (base 2), this formula is mantissa×$2^{exponent}$ For example, the number 2 may be represented in binary floating-point using a sign bit of zero (to indicate a positive number), an exponent value of 1, and a mantissa value of 1 ($1\times2^1=2$). The values for the mantissa and exponent fields may have special encodings. For example a leading bit of "1" for the mantissa is often implied, and the exponent field is usually biased so that it can be read as an unsigned number. As opposed to fixed-point representation, the decimal point in floating-point representation can "float" anywhere within the bits of the mantissa.

A given floating-point standard may specify different "precisions," a term used to refer to the number of bits used to represent numbers. For example, the IEEE 754 standard defines four precisions of binary floating-point numbers using 16, 32, 64, and 128 bits. Each IEEE precision uses different numbers of bits to represent mantissa and exponent values of a number. In some cases, a floating-point instruction may specify that the result of a particular floating-point instruction is to be stored in memory using a particular precision.

Computing elements using floating-point numbers (such as graphics processing units (GPUs)) are often designed for performance, with little regard for power consumption. Typically, computation involving floating-point numbers is performed at the highest precision supported by a processing unit; results are then converted to a lower precision if a lower precision is required. Furthermore, floating-point numbers are often stored by a processing unit using a largest precision supported by the processing unit, regardless of the actual precision of the number. In these scenarios, a floating-point number stored using one type of precision is read from memory using that type of precision before it can be converted to another type of precision.

SUMMARY

This disclosure relates to a processing unit configured to perform operations using different precisions of computer numbers such as floating-point numbers. In one embodiment, a processing unit may support representation of floating-point numbers using two different precisions. The processing unit may further support a storage format that allows floating-point numbers represented and stored using the greater of these two precisions to be read using the lesser precision by reading from memory only the number of bits specified by the lesser precision. Therefore, in certain embodiments, processor power consumption may be reduced, in contrast to an implementation in which the greater number of bits are read from a memory location and then certain bits are simply not used for further processing. The benefit of this reduction in power may offset the loss in precision, particularly in applications such as graphical processing in which the difference in precision may not be important.

In some embodiments, a storage format also includes a floating-point type value that specifies further information about the stored representation of a floating-point number. In one embodiment, the floating-point type value specifies whether the stored representation was stored using the lesser precision or the greater precision, and may be used when reading from memory to determine how to process a retrieved value. For values stored using the greater precision, the floating-point type value may in some cases further specify information about the range of the number, which may allow for special handling of certain floating-point numbers.

In one particular embodiment, a processor supports representation of floating-point numbers using both 16-bit and 32-bit precision (this disclosure is not limited to any particular precisions, however). A data processing unit within the processor may support a storage format that, in addition to the value being stored, includes a floating-point type value that includes information about the value, such as whether it was stored using 16-bit or 32-bit precision. In one embodiment, the storage format used in memory may be arranged to permit a 32-bit number to be interpreted as a 16-bit number by reading 16 bits from memory along with the associated floating-point type value (which may be in the memory or some other data store), and then using the floating-point type value to determine how to process the retrieved 16 bits in the data processing unit (e.g., to determine whether the retrieved bits can be validly represented using 16 bits). To continue this example, consider an instruction that writes 32 bits to a memory location. The disclosure describes embodiments in which the 32 bits are written to memory according to certain arrangements of bits, along with a floating-point type value (stored in memory or elsewhere) indicating that the value was written using 32 bits and further indicating, for example, that this particular number is able to represented with 16-bit precision. A subsequent instruction may specify that the result of a load from the same memory location is to be a 16-bit value. A conventional approach is to read the 32-bit value from memory and discard unneeded bits within the data processing unit. As described below, however, because of the manner in which the bits were originally stored using the disclosed storage format, only 16 bits need be read from memory for this read, along with the bits that specify the floating-point type value (2 bits in one embodiment). This approach thus represents a potential reduction in power consumption in some embodiments.

BRIEF DESCRIPTION OF THE DRAWINGS

FIG. 3 illustrates different floating-point storage formats.

FIGS. 5A and 5B are flow diagrams illustrating embodiments of storing and reading floating-point values.

FIGS. 8A and 8B illustrate examples of floating-point numbers and their representations in different floating-point precisions and a floating-point storage format.

This specification includes references to "one embodiment," "an embodiment," "one implementation," or "an implementation." The appearances of these phrases do not necessarily refer to the same embodiment or implementation. Particular features, structures, or characteristics may be combined in any suitable manner consistent with this disclosure.

Further, various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

DETAILED DESCRIPTION

In this disclosure a "precision" of a floating-point number refers to the number of bits used to represent the floating-point number. For example, a floating-point number represented using a "first precision" could be a 16-bit IEEE representation of a floating-point number, and a "second precision" could be a 64-bit IEEE representation of the floating-point number. The "format" of a floating-point number refers to what bits within the stored representation of the number correspond to the different parts of the floating-point number (e.g., what bits correspond to the exponent, etc.). Accordingly, two numbers having the same precision could have different formats. In various embodiments, a given floating-point representation may include special values such as infinity, subnormal numbers, Not a Number (NaN), etc., which may be represented differently in different formats. Subnormal numbers (also called denormal numbers) are small numbers close to zero that can be represented using less precision than the full precision of a floating-point representation, but using better precision than flushing such numbers to zero. NaN refers to an undefined or un-representable number, such as zero divided by zero, or the square root of a negative number.

Figure 1:
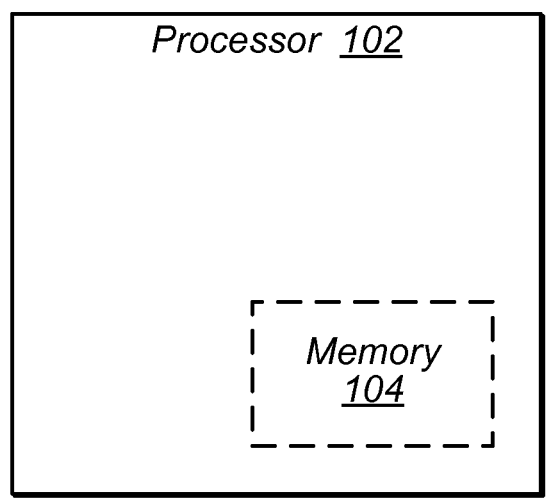
FIG. 1 is a block diagram of one embodiment of a processor and a memory.

Turning now to FIG. 1, a block diagram of a processor 102 and a memory 104 is shown. The processor may implement any instruction set architecture, and may be configured to execute instructions defined in that instruction set architecture. The processor 102 may employ any microarchitecture, including scalar, superscalar, pipelined, superpipelined, out of order, in order, speculative, non-speculative, etc., or combinations thereof. The processor 102 may include circuitry, and optionally may implement microcoding techniques. The processor 102 may include one or more L1 caches, as well as one or more additional levels of cache between the processors and one or more memory controllers. Other embodiments may include multiple levels of caches in the processors, and still other embodiments may not include any caches between the processor 102 and the memory controllers. In some embodiments, processor 102 may be a data processing unit such as a graphics processing unit (GPU) or other type of processor. Processor 102 may be located in any suitable apparatus, including various types of computing devices.

Memory 104 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with a system on a chip in a chip-on-chip configuration, a package-on-package configuration, or a multi-chip module configuration. Memory 104 may be physically located within a processor, and may be a register file or a cache. In other embodiments, memory 104 may be coupled to the processor. A data processing unit (not shown) may be used by a processor to handle reads and writes to and from memory 104, and the memory may be located within the data processing unit. This disclosure is not intended to limit location and/or connectivity of the memory 104.

Figure 2A:
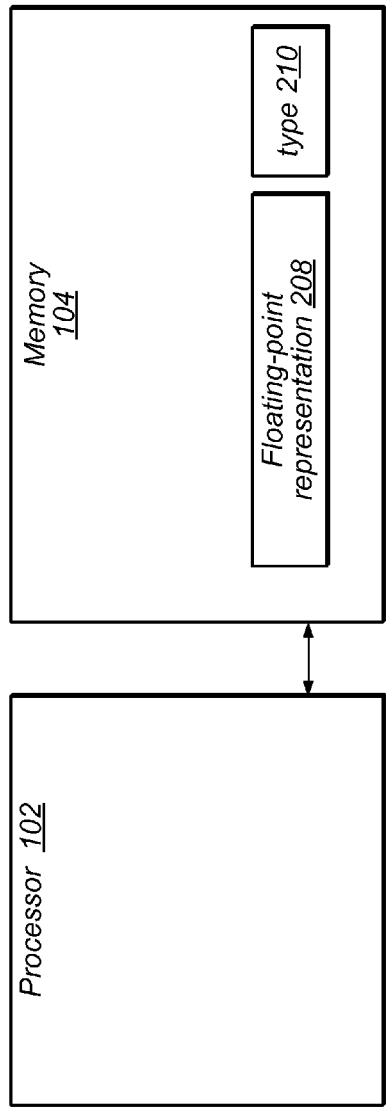
FIGS. 2A and 2B are block diagrams of different embodiments of a processor and memory system.

Turning now to FIG. 2A, one embodiment of a memory 104 is shown. Where applicable, components of the systems of FIGS. 2A and 2B have the same reference numerals as in FIG. 1. Memory 104 is coupled to processor 102 and configured to store a floating-point representation 208 and a floating-point type value 210 corresponding to the floating-point representation. In some embodiments the floating-point type value corresponding to a stored representation of a floating-point number may be stored in the same memory location as the representation. Other locations for floating-point type values are contemplated, including other locations in memory, caches, tables, etc.

Figure 2B:
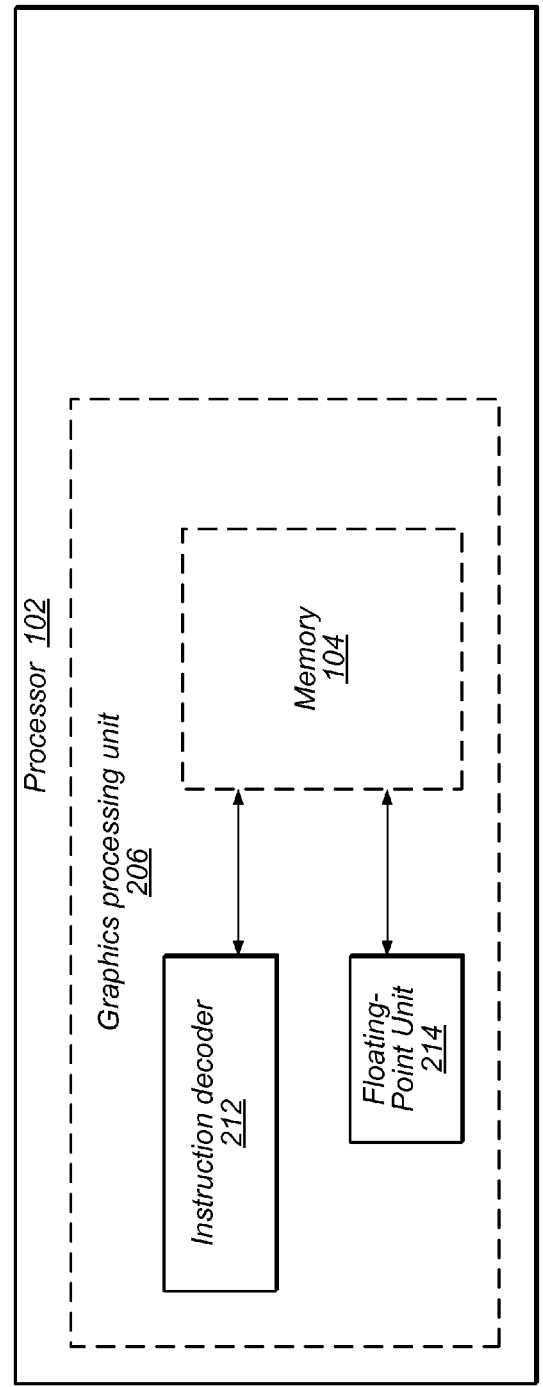

Turning now to FIG. 2B, another embodiment of a processor 102 is shown. Graphics Processing Unit (GPU) 206 may be a data processing unit that contains an instruction decoder 212, memory 104, and a Floating Point Unit (FPU) 214. As indicated by the dotted lines, the GPU may be located within the processor or external to the processor. If external to the processor, the GPU may be coupled to the processor using a bus such as a PCI express bus and/or attached to a system-on-a-chip along with the processor, or elsewhere. The memory 104 may be located within the GPU, or elsewhere. In some embodiments, the memory 104 may be a register file in the GPU 206. As described below, in some embodiments, this register file may be split into separately accessible portions.

In one embodiment, the instruction decoder 212 may decode instructions with floating-point operands that are stored in memory 104. Computation using the operands as inputs may be performed in the FPU 214 and the results stored back into the memory 104. The instruction decoder 212 may be configured to decode instructions with different operand precisions. In other words, some instructions may use one or more operands and/or produce results of a first precision, and other instructions may use one or more operands and/or produce results of a second precision.

Turning now to FIG. 3, two exemplary formats for representation of floating-point numbers are shown (elements 310 and 320). As illustrated, format 310 uses 16-bit precision while format 320 uses 32-bit precision. Formats 310 and 320 correspond to IEEE formats, but any suitable format may be used in other embodiments.

Format 310 includes a sign bit (denoted by S), five exponent bits (denoted by E's), and ten mantissa bits (denoted by M's). Format 320 includes a sign bit (denoted by S), eight exponent bits (denoted by either E's or e's), and twenty-three mantissa bits (denoted by either M's or m's). As previously discussed, the absolute value of a binary floating-point number may be computed using the formula: mantissa×$2^{exponent}$ The upper-case/lower-case nomenclature for the bits is used to indicate shifting of bits when using storage format 330.

Floating-point storage format 330 of FIG. 3 is one embodiment of a different storage format for representing floating-point numbers. Storage format 330 may be used to read and store both 32-bit and 16-bit floating-point numbers, as described further below. In this embodiment, storage format 330 includes 32 bits of floating-point number data, and two floating-point type value bits (the two type bits are denoted by t's). The floating-point type value holds further information about a stored floating-point number. In other embodiments, floating-point type values may be stored using other means and/or other encodings. The 16-bit and 32-bit floating-point precisions are exemplary of one embodiment, and may be replaced by other floating-point precisions in other embodiments. Also, the storage format 330 may be modified to store other precisions. For example, the first precision may be a 64-bit precision and the second precision a 128-bit precision, and the storage format 330 may be extended to accommodate those representations.

As illustrated by FIG. 3, a 16-bit floating-point number may be read from a location using storage format 330 by reading only 16 bits of the floating-point storage format (the bits represented by upper-case letters). A 32-bit number may be read by reading all of the bits of the storage format; subsequently, the 32-bit number that was read can be processed by rearranging some of the bits. In one embodiment, the rearranging is performed by shifting the "e" bits from the $17^{th}$, $18^{th}$, and $19^{th}$ bit positions to the $3^{rd}$, $4^{th}$, and $5^{th}$ bit positions as shown by the arrow and circled "e" bits in FIG. 3. In other embodiments, the rearranging may be performed simply by rerouting the indicated bit positions. In the exemplary embodiment of FIG. 3, the most significant bit of the exponent field of 32-bit floating-point format 320 is included in high-order portion of storage format 330 along with the four lower-order exponent bits because in the example shown, the most significant bit corresponds to a bias or sign of the exponent. In other embodiments, bits of the greater-precision format may be rearranged differently to form the storage format used in memory.

In other embodiments, computing systems may use storage format 330 for all operations involving 32-bit floating-point numbers without converting the storage format to more common 32-bit floating-point representations such as 320. Accordingly, the use of format 330 may permit a processing unit such as a GPU to read two different precision values from the same location in memory; in some instances, this storage format may facilitate a power savings for the processing unit by permitting a read of only half the bits stored in the format, along with the type bits (as opposed to requiring a read of all bits when only some are needed).

For a given precision and format, there is a range of floating-point numbers that can be represented. For example, for a given 16-bit precision format, there may be many 32-bit floating-point numbers that fall outside this range (e.g. because the exponent field of the 32-bit floating-point number is too large to represent using the number of exponent bits of the 16-bit precision format). Therefore, if a 32-bit number is stored using the storage format 330, it may not be represented correctly when read using only the 16 bits shown in upper case. In some embodiments, when a number is stored using storage format 330, the floating-point type value bits ("t" bits) may be set to indicate whether or not the floating-point number represented was stored using 16 or 32 bits. This information can then be used when reading from a memory location that uses format 330. In some embodiments, the floating-point type value bits may further specify, for a number stored using 32 bits, whether the number is within, above, or below the range of numbers representable using 16-bit precision.

Consider a number of situations in which a floating-point number represented using a 32-bit precision was stored using storage format 330, and then read using only 16 bits in order to obtain a 16-bit representation of the floating-point number. If the number is below the range representable by a 16-bit floating-point number, it may be read as a zero (or flushed to zero). If the number is above the range representable by a 16-bit floating-point number, it may be read as plus infinity or minus infinity, depending on the sign of the floating-point number. If a number is within the range representable by a 16-bit floating-point number, it may be read as a 16-bit floating-point number, using only the bits of storage format 330 shown in upper case. Such a 16-bit read may result in some loss of precision compared to a 32-bit representation of a floating-point number; however, in many applications (such as graphics), this loss of precision may be acceptable. Embodiments are contemplated in which the floating-point type value also indicates whether or not precision may be lost during truncation, which may correspond to whether or not there are 1's in the bits shown in lower case. The floating-point type value may also include additional information in other embodiments, and include any suitable number of bits.

If a floating-point number represented using 16-bit precision is stored using storage format 330, not all bits of the storage format may be used. For example, the bits of storage format 330 denoted by lower-case letters may not be written when storing a 16-bit floating-point number. Therefore, when a 16-bit floating-point number is stored using storage format 330, the floating-point type value may indicate that a 16-bit floating-point number was stored, in which case the bits shown in lower case may have undetermined values. If a 32-bit representation of the floating-point number is requested, the lower-case bits of the storage format may be discarded and replaced with zeroes in some embodiments. The "e" bits may then be shifted as previously described, in order to represent the floating-point number using 32-bit precision.

As described above, storage format 330 allows reading and storing floating-point numbers using both a first precision (e.g., 16 bits) and a second precision (e.g., 32 bits). When operating using 16-bit precision, only sixteen bits of the storage format and two bits of the type value may need to be read from a location in memory that uses format 330. This reduction in number of bits read from memory may reduce power consumption when compared to reading 32 bits for every memory access, even if only 16 bits are needed.

In certain embodiments that use the floating-point type value bits of storage format 330, type bits of "00" may correspond to a number represented and/or stored using 32 bits that is readable as a 16-bit number (in other words, a number within the range representable by a 16-bit number, although the read may result in loss of precision as previously described). Type bits of "01" may correspond to number represented and/or stored using 32 bits that is too small to represent as a 16-bit number. Type bits of "10" may correspond to number represented and/or stored using 32 bits that is too large to represent as a 16-bit number. Type bits of "11" may correspond to number represented and/or stored using 16 bits, in which case only the upper-case bits of the storage format 330 are valid. As previously mentioned, this embodiment of two-bit encoding of floating-point type values is merely exemplary, and other embodiments for representing and storing floating-point type values are contemplated.

In some applications, the loss of precision when reading 16-bit representations of numbers initially represented as 32-bits is acceptable. In GPUs for example, loss of precision when reading 16-bit floating-point may not be problematic (e.g., not visually detectable). Therefore, embodiments of systems using storage formats similar to that of storage format 330 may achieve reduced power consumption by sometimes reading higher-precision floating-point numbers as lower-precision floating-point numbers.

Figure 4:
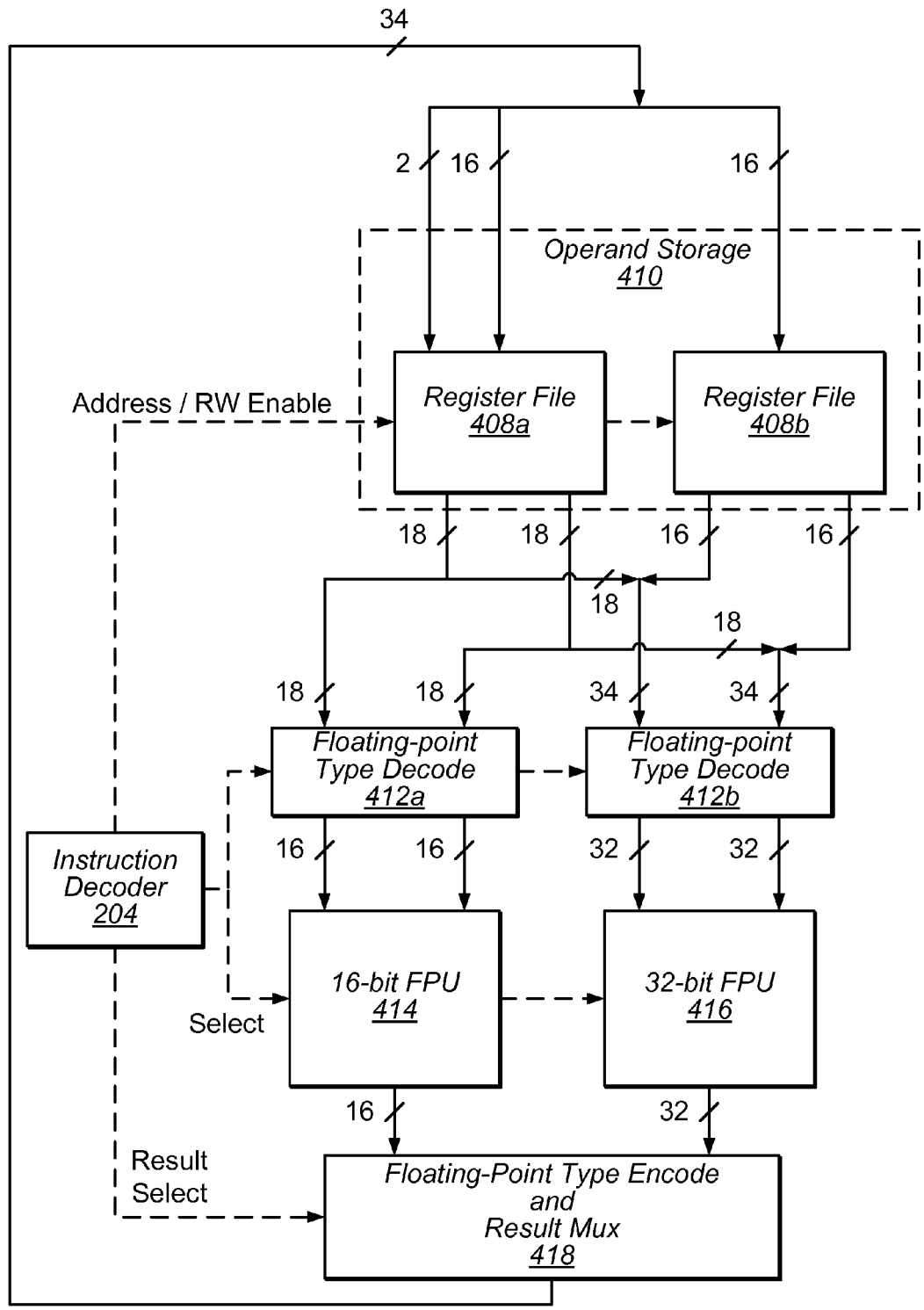
FIG. 4 is a block diagram of one embodiment of a data processing unit including a datapath for floating-point numbers and utilizing a storage format for floating-point numbers.

Turning now to FIG. 4, a block diagram of a data processing unit configured to operate on floating-point numbers is shown. The term "data processing unit" may refer in one embodiment to a GPU, elements within a GPU, elements within a processor, or other configurations of chips, circuits, etc. In the embodiment shown, instruction decoder 204 may receive instructions and, for each instruction, determine the precision of one or more operands and the result of the instruction.

In the embodiment shown, floating-point instructions may have operands and results of either 32-bit precision or 16-bit precision. In one embodiment, instruction decoder 204 may determine the precision of operands by reading a bit in the instruction. The bit may indicate whether or not the instruction requires 16-bit precision, or, more broadly, "lower precision". In other embodiments, the precision of the operands of an instruction may be otherwise encoded in the instruction, such as in a prefix of an instruction. In other embodiments, a processor mode may determine the precision of instruction operands. For example, in a lower-precision mode, all floating-point operands might use a lower precision or all instructions might be required to use lower-precision operands.

Register files 408a and 408b are one exemplary embodiment of memory 104 and may store floating-point operands according to storage format 330. Register file 408a may include locations to store the high 16 bits (upper-case bits shown in FIG. 3) of storage format 330 and the floating-point type bits ("t" bits). Register file 408b may include locations to store the low 16 bits (lower-case bits) of storage format 330. For 16-bit instructions, or in a 16-bit mode, only register file 408a may be read from or stored to in various embodiments. By not reading from or storing to register file 408b, power consumption may be reduced. A request to read from memory such as 408a and/or 408b may be associated with a certain precision (e.g., because of an opcode in the request, a prefix of the request, some other bit or bits in the instruction, a current mode of the processor, etc.). In many cases, the number of bits read from a register file or memory may be based on the precision associated with the request. In one embodiment, the association of a request with a certain precision may be indicated by instruction decoder 204 (e.g., based on instruction opcode, prefix, etc.). In other embodiments, the indication may be given by other elements or circuitry and may be based on an instruction or a processor mode. Other embodiments may use other types of memory and/or use other elements to indicate the precision associated with a memory request.

Floating-point type decode blocks 412a and 412b may be used in some embodiments to convert floating-point representations using storage format 330 back to common floating-point representations such as IEEE 32-bit and IEEE 16-bit representations before the operands reach FPUs 414 and 416. In other embodiments, FPUs 414 and 416 may be configured to operate directly on floating-point representations such as storage format 330 without conversion. If present, floating-point type decode blocks 412a and 412b may use floating-point type value bits of storage format 330 to correctly read and/or decode the stored floating-point representation as another floating-point representation.

The 16-bit FPU 414 may be configured to perform computation using 16-bit floating-point operands. In one embodiment, two 16-bit operands may be provided to FPU 414 after being read from register file 408a and decoded. The 32-bit FPU 416 may be configured to perform computation using 32-bit floating-point operands. Based on the instruction decoder 204 determining whether an instruction uses 16-bit or 32-bit operands and results, one of FPUs 414 and 416 may be used. The results of FPU 414 and 416 may be encoded using storage format 330 or a similar storage format before being stored in register file 408a and/or 408b by the floating-point type encode and result MUX 418. MUX 418 may also select whether the result of FPU 414 or FPU 416 should be used.

(Note, as used herein, the term "based on" is used to describe one or more factors that affect a determination. This term does not foreclose additional factors that may affect a determination. That is, a determination may be based solely on those factors or based at least in part on those factors. Consider the phrase "determine A based on B." While B may be a factor that affects the determination of A, such a phrase does not foreclose the determination of A from also being based on C. In other instances, A may be determined based solely on B.)

The exemplary embodiment of FIG. 4 is not intended to limit operands, buses, or values to the precisions or number of bits shown in the FIG. 4. These details are simply provided to better explain one embodiment.

FIG. 4 may be described as having two datapaths, one for 16-bit operations and one for 32-bit operations. In the embodiment of FIG. 4, the first datapath includes register file 408a, floating-point type decode block 412a, and 16-bit FPU 414. The second datapath includes both register files 408a and 408b, floating-point type decode block 412b, and the 32-bit FPU 416. In various embodiments, a first datapath may perform computation using a lower precision (e.g. 16 bits), and a second datapath may perform computation using a greater precision (e.g. 32 bits). Both datapaths consume power when enabled, although the lower-precision datapath may consume less power than the greater-precision datapath because of the smaller number of bits required in computation.

In some embodiments using a lower precision and a greater precision, only one of the datapaths may be used for a given instruction, and the other datapath may be disabled. In the embodiment shown in FIG. 4, for a given instruction, only one datapath is used to compute a result of the instruction. Based on the precision of an instruction's operands and result, the instruction decoder 204 selects one datapath for use and disables the unused datapath in order to reduce power consumption. The unused datapath may be disabled using one or more signals from instruction decoder 204 (indicted by the "Select" arrow of FIG. 4). In various embodiments, disabling a datapath may include clock gating the datapath (i.e., disabling clock signals to the datapath), which may eliminate switching power loss in that datapath. In other embodiments, disabling a datapath may include other methods for reducing power and/or preventing operation of a datapath, such as by removing or reducing power to the datapath.

As previously described, datapaths may be selected for use based on operands and results of instructions. In other embodiments, datapaths may be selected or clock gated based on a mode of operation. In other embodiments, other elements besides the instruction decoder 204 may cause datapath selection and/or clock gating.

If a datapath is selected for use based on an instruction, the instruction may include a bit to indicate the precision of the instruction's operands and result. In other embodiments, a prefix of an instruction may indicate the precision of an instruction's operands and result. In some embodiments, a mode may be used to select a datapath and/or clock-gate another datapath. (For example, in one embodiment, an instruction may set a 16-bit mode; subsequent instructions are then executed in this mode until a new mode is set.) Said another way, in a first mode, the data processing unit may use the lower-precision datapath, and in a second mode, the data processing unit may use the greater-precision datapath. A mode may be entered in response to an event or condition. For example, an event may be a change or loss of a power source. A condition may be a battery state or level. In other embodiments, a mode may be entered based on user input. For example, a user may select a low-power mode, which corresponds to the data processing unit using only a lower precision datapath and clock gating a higher precision datapath.

In other embodiments, datapaths may include other elements in place of, or in addition to the elements shown in FIG. 4. More than two datapaths may be used, and the datapaths may use more than two different precisions for computation. One or more of the datapaths may be clock gated during operation. In some embodiments, datapaths may include multiple FPUs and perform operations on a plurality of instructions in parallel. In various embodiments, disabling one or more unused datapaths may result in power savings. Furthermore, using datapaths of a lowest precision sufficient to correctly execute instructions may reduce power consumption.

Turning now to FIG. 5A, a flow diagram of method 500 illustrating storage of a floating-point number is shown. A first representation of a floating-point number is received (block 510). A floating-point type value is set for the floating-point number (block 520), which may include information corresponding to the precision of the first representation of the floating-point number, and/or the range of the floating-point number. A second representation of the floating-point number and the floating-point type value are stored (blocks 530 and 540). In some cases, the first and second representations may be the same. In other cases, the second representation of the floating-point number may correspond to the first representation of the floating-point number with one or more bits rearranged as illustrated by the storage format 330 of FIG. 3.

Turning now to FIG. 5B, a flow diagram of a method 550 illustrating reading of a floating-point number is shown. A request for a location in memory is received (block 560). Information is then retrieved from the location in memory (block 570). The retrieved information may be the entire contents of the location in memory (e.g., all 32 bits of a 32-bit representation), or only part of the contents of the location (e.g., 16 bits of a 32-bit representation). The floating-point type value corresponding to the requested location in memory is retrieved (block 580). The retrieved information is processed based on the floating-point type value (block 590). Processing the retrieved information may include any number of actions based on the floating-point type value, including, but not limited to, rearranging bits of the retrieved information or setting a result to zero, plus infinity, or minus infinity.

Figure 6:
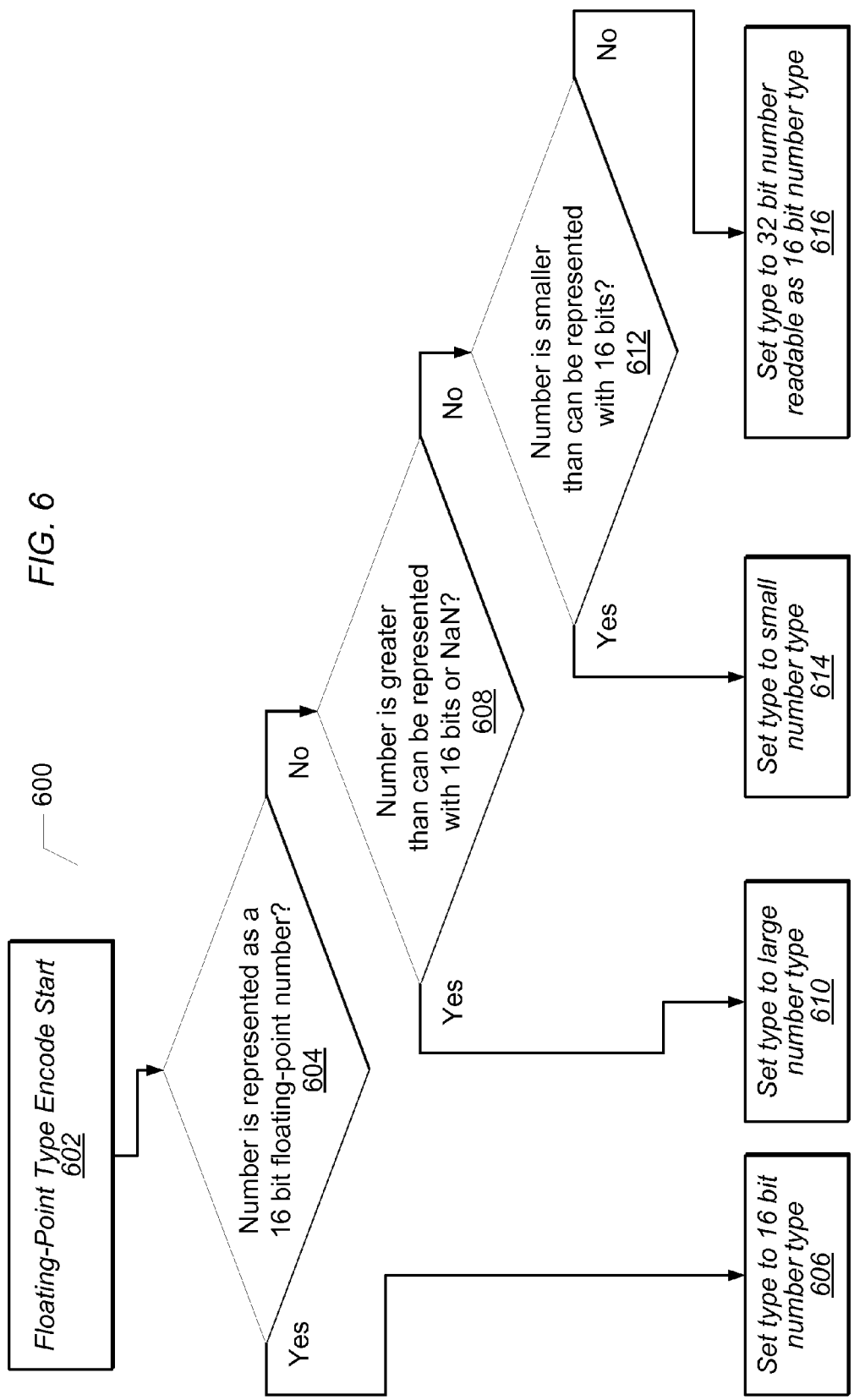
FIG. 6 is a flow diagram illustrating encoding of a floating-point type.

Turning now to FIG. 6, a flow diagram of a method 600 illustrating one embodiment of encoding of a floating-point type value for 16-bit and 32-bit floating-point numbers is shown. If a number is represented as a 16-bit floating-point number (determined in block 604), the type is set to a 16-bit number type (block 606). Otherwise, if the number is greater than can be represented in 16 bits or NaN (determined in block 608), the type is set to a large number type (block 610). Otherwise, if the number is smaller than can be represented with 16 bits (determined in block 612), the type is set to a small number type (block 614). Otherwise, the type is set to a 32-bit number readable as a 16-bit number type (block 616). The floating-point types of FIG. 6 may be encoded using the floating-point type value bits ("t" bits) of FIG. 3, or otherwise represented and stored. The exemplary embodiment of FIG. 6 is not intended to limit operands or values to the precisions or number of bits shown. The 16 and 32-bit precisions are used to better explain one embodiment, but not to limit other embodiments. Additional floating-point types are contemplated.

Figure 7:
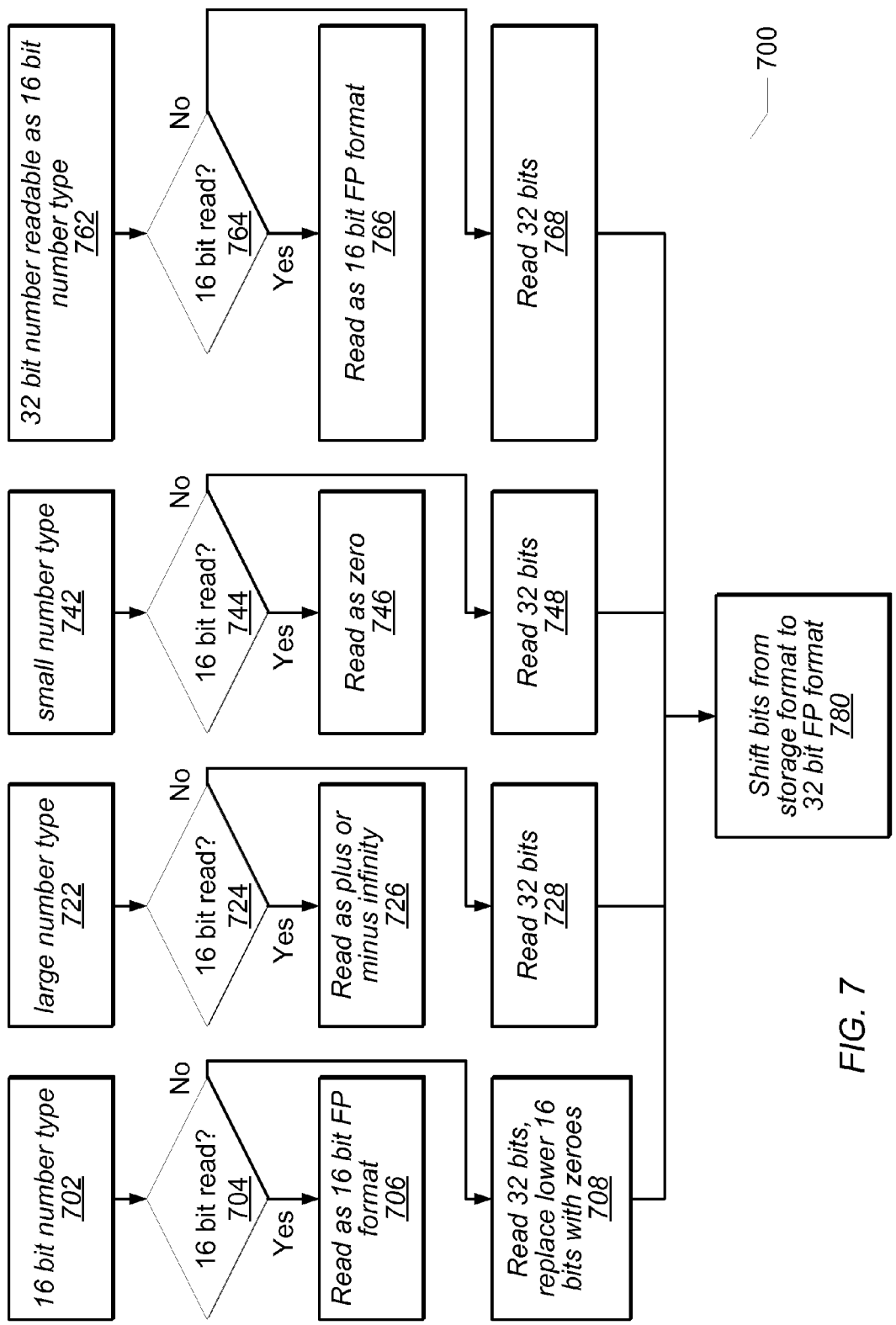
FIG. 7 is a flow diagram illustrating decoding of a floating-point type.

Turning now to FIG. 7, a flow diagram of a method 700 illustrating decoding of a stored 32-bit or 16-bit floating-point number representation is shown. If the type is a 16-bit number type (block 702) and read using 16 bits (determined in block 704), 16 bits of the number are read using a 16-bit floating-point precision (block 706). If not read using 16 bits, 32 bits of the stored number are read, the lower bits are replaced with zeros (block 708) and bits are shifted to represent the number using a 32-bit precision (block 780). If the type is a large number type (block 722) and read using 16 bits (determined in block 724), the number is read as plus infinity or minus infinity, depending on the sign bit of the stored representation (block 726). If not read using 16 bits, 32 bits of the stored number are read (block 728) and bits are shifted to represent the number using a 32-bit precision (block 780). If the type is a small number type (block 742) and read using 16 bits (determined in block 744), the number is read as zero (block 746). If not read using 16 bits, 32 bits of the stored number are read (block 748) and bits are shifted to represent the number using a 32-bit precision (block 780). If the type is a 32-bit number readable as a 16-bit number (block 762) and read using 16 bits (determined in block 764), 16 bits of the number are read using a 16-bit floating-point precision (block 766). If not read using 16 bits, 32 bits of the stored number are read (block 768) and bits are shifted to represent the number using a 32-bit precision (block 780). The exemplary embodiment of FIG. 7 is not intended to limit operands or values to the precisions or number of bits shown. The 16 and 32-bit precisions are used to better explain one embodiment, but not to limit other embodiments.

Turning now to FIGS. 8A and 8B, examples of floating-point numbers represented in IEEE 32-bit precision, IEEE 16-bit precision, and storage format 330 are shown. In Example 1 of FIG. 8A, the number 2 is to be stored using 32 bits. The 32-bit floating-point representation 810 of the number two is shown. The 16-bit floating-point representation 820 of the number two is shown. The value stored 830 has a floating-point type value of 00 (binary), and can be read using either a 16-bit or a 32-bit precision. (If read using 32-bit precision, the bits may be shifted after reading the stored value).

In Example 2 of FIG. 8A, the number $2^{16}$ (65,536 in decimal) is to be stored using 32 bits. The 32-bit floating-point representation 840 of the number is shown. This number is not representable using IEEE 16-bit floating-point precision. The value stored (reference numeral 860) has a floating-point type value of 10 (binary). If read using 16-bit precision, the floating-point number may be read as plus infinity. If read using 32-bit precision, the bits may be shifted after reading the stored value.

In Example 3 of FIG. 8B, the number $2^{-18}$ (approximately 0.00000381 in decimal) is to be stored using 32 bits. The 32-bit floating-point representation 910 of the number is shown. This number is not representable using IEEE 16-bit floating-point precision. The value stored 930 has a floating-point type value of 01 (binary). If read using 16-bit precision, the floating-point number may be read as zero. If read using 32-bit precision, the bits may be shifted after reading the stored value.

In Example 4 of FIG. 8B, the number 2 is to be stored using 16 bits. The 32-bit floating-point representation 940 and 16-bit floating-point representation 950 of this number are shown. The value stored 960 has a floating-point type value of 11 (binary), and can be read using either a 16-bit or a 32-bit precision. The lower bits of the value stored 960 are undefined as denoted by "x", because only 16 bits were stored. (If read using 32-bit precision, the lower bits may be discarded and replaced with zeroes, and the remaining bits may be shifted). The examples of FIGS. 8A and 8A are not intended to limit operands or values to the precisions or number of bits shown. The 16 and 32-bit precisions are used to better explain one embodiment, but not to limit other embodiments.

While the disclosure and examples above relate to floating-point numbers, the methods and devices discussed may also be applicable in the context of other types of number representations. For example, fixed-point numbers are represented in various formats with different precisions, and integer formats require greater precisions for larger numbers than for relatively smaller numbers. Therefore, storage formats and datapath clock gating such as those described may be used for fixed-point representations of numbers and/or integer representations of numbers in order to reduce power consumption in data processing units utilizing those representations. Accordingly, storage format 330 may be appropriately adapted for fixed-point or other numerical representations as desired, including representations to be defined in the future.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
a data processing unit in a processor receiving a first representation of a floating-point number, wherein the processor supports representation of floating-point numbers using a first precision having a first number of bits and a second precision having a second number of bits, wherein the second number of bits is greater than the first number of bits, wherein the first representation of the floating-point number uses the second precision;
the data processing unit generating a floating-point type value that indicates that the first representation uses the second precision, and wherein the floating-point type value further indicates whether the floating-point number falls within a range of floating-point numbers representable using the first precision;
the data processing unit causing the floating-point number to be stored in a location in a memory using the second number of bits; and
the data processing unit causing the floating-point type value to be stored in the memory;
in response to a request for the first number of bits from the location in memory, the data processing unit:
retrieving only the first number of bits from the location in memory;
retrieving the floating-point type value; and
processing the retrieved first number of bits based on the floating-point type value.

2. The method of claim 1,
wherein the floating-point number is stored in the location using a second representation having the second number of bits, wherein the second representation is generated by rearranging bits of the first representation.

3. The method of claim 1,
wherein the location in the memory includes first and second portions that are separately accessible, wherein the first portion includes the first number of bits and wherein first portion and the second portion combined include the second number of bits.

4. The method of claim 1,
wherein the floating-point type value indicates that the floating-point is not representable using the first precision because it falls above or below a range of numbers representable using the first precision; and
wherein the processing includes providing a greatest or smallest value representable using the first precision.

5. The method of claim 1, further comprising:
the data processing unit receiving a representation of a second floating-point number that uses the first precision;
the data processing unit generating a floating-point type value that indicates that the representation of the second floating-point number uses the first precision;
the data processing unit causing the second floating-point number to be stored in a second location in the memory using the first number of bits;
in response to a request of a second type for data from the second location in memory, the data processing unit:
retrieving data from the second location in memory;
retrieving the floating-point type value; and
processing the retrieved data based on the floating-point type value to generate a representation of the second floating-point number that uses the second number of bits.

6. A method, comprising:
in response to a request to retrieve a first number of bits of a stored representation of a floating-point number from a location in a memory, a data processing unit in a processor retrieving a set of bits of the stored representation from the location in memory;

retrieving a floating-point type value from the memory, wherein the processor supports representation of floating-point numbers using a first precision having the first number of bits and a second precision having a second number of bits, wherein the second number of bits is greater than the first number of bits, and wherein the floating-point type value indicates whether the stored representation was stored using the first number of bits or the second number of bits; and processing the retrieved set of bits based on the floating-point type value;

wherein the set of bits includes only the first number of bits and wherein the floating-point type value indicates that the stored representation uses the second number of bits and wherein the floating-point type value further indicates whether the floating-point number falls within a range of floating-point numbers representable using the first precision.

7. The method of claim 6, further comprising:

in response to a second type of request to retrieve the stored representation of the floating-point number from the location in the memory, retrieving a second set of bits of the stored representation, wherein the second set of bits includes the second number of bits;

rearranging the second set of bits; and providing the rearranged second set of bits in response to the second type of request.

8. The method of claim 6, wherein the floating-point number is stored in the location using a second representation having the second precision, wherein the second representation is generated by rearranging bits of the first representation.

9. An apparatus comprising a data processing unit, wherein the data processing unit is configured to:

represent floating-point numbers using a first precision having a first number of bits and a second precision having a second number of bits, wherein the second number of bits is greater than the first number of bits;

set a floating-point type value for a first representation of a floating-point number, wherein the floating-point type value indicates that the first representation uses the second precision and wherein the floating-point type value further indicates whether the floating-point number falls within a range of floating-point numbers representable using the first precision;

cause a second representation of the floating-point number to be stored in a location in a memory; and cause the floating-point type value to be stored in the memory.

10. The apparatus of claim 9, wherein the apparatus is configured to form the second representation by rearranging bits of the first representation.

11. The apparatus of claim 9:

wherein the data processing unit is configured to cause the second representation to be stored as:

a first set of bits equal in number to the first number of bits, wherein the first set of bits comprises:

a sign bit;

one or more exponent bits of the first representation; and one or more mantissa bits of the first representation;

a second set of bits comprising:

one or more exponent bits of the first representation; and one or more mantissa bits of the first representation.

12. The apparatus of claim 9, wherein, the data processing unit is further configured to:

receive a request for the first number of bits from the location in memory;

retrieve only the first number of bits from the location in memory in response to the request;

retrieve the floating-point type value; and process the retrieved bits based on the retrieved floating-point type value.

13. An apparatus comprising a data processing unit, wherein the data processing unit is configured to:

represent floating-point numbers using a first precision having a first number of bits and a second precision having a second number of bits, wherein the second number of bits is greater than the first number of bits;

in response to a request for a stored representation of a floating-point number:

retrieve a number bits of the stored representation that is smaller than the second number of bits and greater than or equal to the first number of bits;

retrieve a stored floating-point type value, wherein the floating-point type value indicates that the stored representation uses the second number of bits and wherein the floating-point type value further indicates whether the floating-point number falls within a range of floating-point numbers representable using the first precision; and process the retrieved bits based on the floating-point type value.

14. The apparatus of claim 13, wherein the data processing unit is configured to process the retrieved bits by shifting one or more of the retrieved bits.

15. The apparatus of claim 13, wherein the floating-point type value indicates that the floating-point number falls above or below a range of numbers representable using the first precision; and wherein, to process the retrieved bits based on the floating-point type value, the apparatus is configured to provide a greatest or smallest value representable using the first precision.

16. A system, comprising:

a processor including a data processing unit; and a memory;

wherein the data processing unit is configured to:

set a type value for a first representation of a number, wherein the processor supports representation of numbers using a first precision having a first number of bits and a second precision having a second number of bits, wherein the second number of bits is greater than the first number of bits, and wherein the type value indicates whether the first representation uses the first precision or the second precision and wherein the floating-point type value further indicates whether the number falls above or below a range of numbers representable using the first precision;

cause a second representation of the number to be stored in a location in memory; and cause the type value to be stored in the memory.

17. The system of claim 16, wherein the data processing unit is further configured to:

in response to a request for the first number of bits from the location in memory, retrieve the first number of bits and not the second number of bits from the location in memory and retrieve the type value; and process the retrieved first number of bits based on the type value.

18. The system of claim 17, wherein the data processing unit is further configured to:

in response to a request of a second type for the location in memory, retrieve the second number of bits from the location in memory and retrieve the type value; and process the retrieved second number of bits based on the type value.

19. The system of claim 18, wherein when processing the retrieved information based on the type value the data processing unit is further configured to rearrange the retrieved second number of bits.

20. The system of claim 16, wherein the number is a floating-point number.

* * * * *